United States Patent
Takagi et al.

(10) Patent No.: US 7,114,526 B2
(45) Date of Patent: Oct. 3, 2006

(54) COMPOSITE HOSE WITH A CORRUGATED METAL TUBE

(75) Inventors: Yuji Takagi, Komaki (JP); Minoru Hiramatsu, Kasugai (JP)

(73) Assignee: Tokai Rubber Industries, Inc., (JP)

( * ) Notice: Subject to any disclaimer, the term of this patent is extended or adjusted under 35 U.S.C. 154(b) by 0 days.

(21) Appl. No.: 11/086,705

(22) Filed: Mar. 22, 2005

(65) Prior Publication Data

US 2005/0211325 A1   Sep. 29, 2005

(30) Foreign Application Priority Data

Mar. 29, 2004  (JP) ............................. 2004-096858

(51) Int. Cl.
*F16L 11/00*   (2006.01)

(52) U.S. Cl. ...................... 138/127; 138/123; 138/121; 138/122; 138/143; 138/134

(58) Field of Classification Search ................ 138/127, 138/124, 123, 121, 122, 109, 134, 143
See application file for complete search history.

(56) References Cited

U.S. PATENT DOCUMENTS

| | | | | |
|---|---|---|---|---|
| 2,150,471 A | * | 3/1939 | Vulpen | 285/222.4 |
| 2,256,386 A | * | 9/1941 | Farrar | 138/131 |
| 2,438,146 A | * | 3/1948 | Candee et al. | 174/68.3 |
| 2,449,369 A | * | 9/1948 | Doane et al. | 138/121 |
| 2,757,691 A | * | 8/1956 | Copeland | 285/289.1 |
| 2,785,382 A | * | 3/1957 | Lamb | |
| 2,836,200 A | * | 5/1958 | Webbe | 285/115 |
| 3,318,337 A | * | 5/1967 | Bauer | 138/130 |
| 3,460,579 A | * | 8/1969 | Clarkson | 138/127 |
| 3,580,289 A | * | 5/1971 | James, Jr. et al. | 138/121 |
| 3,599,677 A | * | 8/1971 | O'Brien | 138/122 |
| 3,905,398 A | * | 9/1975 | Johansen et al. | 138/124 |
| 3,951,438 A | * | 4/1976 | Scales | 285/55 |
| 4,147,185 A | * | 4/1979 | Hines | 138/121 |
| 4,384,595 A | * | 5/1983 | Washkewicz et al. | 138/127 |
| 4,674,543 A | * | 6/1987 | Ziemek et al. | 138/153 |
| 4,953,632 A | * | 9/1990 | Sakaya et al. | 165/104.26 |
| 5,069,253 A | * | 12/1991 | Hadley | 138/109 |
| 5,279,333 A | * | 1/1994 | Lawrence | 138/121 |
| 5,297,337 A | * | 3/1994 | Igarashi et al. | 29/890.144 |
| 5,297,586 A | * | 3/1994 | McIntosh | 138/109 |
| 5,398,977 A | * | 3/1995 | Berger et al. | 285/123.17 |
| 5,413,147 A | * | 5/1995 | Moreiras et al. | 138/109 |
| 5,826,623 A | * | 10/1998 | Akiyoshi et al. | 138/126 |
| 5,911,448 A | * | 6/1999 | Feher | 285/222.5 |
| 6,053,213 A | * | 4/2000 | Jung et al. | 138/130 |
| 6,354,332 B1 | | 3/2002 | Burkhardt et al. | 138/109 |
| 6,550,502 B1 | * | 4/2003 | Odru | 138/135 |
| 6,761,188 B1 | * | 7/2004 | Besche et al. | 138/126 |
| 2001/0021428 A1 | * | 9/2001 | Procida et al. | 428/35.8 |
| 2002/0117226 A1 | * | 8/2002 | Malcarne, Jr. | 138/121 |
| 2003/0066568 A1 | * | 4/2003 | Hibino et al. | 138/121 |

(Continued)

FOREIGN PATENT DOCUMENTS

CH     666 105     *   6/1988

(Continued)

*Primary Examiner*—Patrick Brinson
(74) *Attorney, Agent, or Firm*—Andrus, Sceales, Starke & Sawall, LLP (57) ABSTRACT

A composite hose comprises a corrugated metal tube as barrier layer against permeation of conveyed fluid and a reinforcing layer which is formed by braiding a reinforcing wire member made of a metal wire. A braid density of the reinforcing layer is 55% or less.

2 Claims, 10 Drawing Sheets

U.S. PATENT DOCUMENTS

2004/0020545 A1* 2/2004 Takagi et al. ............... 138/109
2004/0090065 A1* 5/2004 Furuta et al. ............... 285/256
2004/0118470 A1* 6/2004 Furuta ....................... 138/139
2004/0200537 A1* 10/2004 Rivest ....................... 138/109

FOREIGN PATENT DOCUMENTS

DE      199 21 724 C 1    *  5/2001
EP       0 567 115 B1     *  8/1997

* cited by examiner

COMPOSITE HOSE WITH A CORRUGATED METAL TUBE

TECHNICAL FIELD

The present invention relates to a composite hose with a corrugated metal tube as a barrier layer against permeation of conveyed fluid, which is preferably usable for conveying fuel in automobiles, conveying refrigerant, conveying fuel of cell such as hydrogen gas used in fuel cell or any other applications.

BACKGROUND OF THE INVENTION

Typical rubber hoses, for example, made of a blend of acrylonitrile-butadiene rubber and polyvinyl chloride (NBR/PVC blend) which is excellent in resistance to gasoline permeability, have been used for conveying fuel (fuel such as gasoline for engine) for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Therefore, such hoses for conveying fuel are required further permeation resistance to fuel.

And, hoses for conveying fuel such as hydrogen gas used in fuel cells, or for conveying carbon dioxide gas refrigerant are required extremely high permeation resistance to such conveyed fluid as hydrogen gas, carbon dioxide gas.

However, with regard to this requirement hoses configured by organic materials only such as rubber or resin are difficult to satisfy such required resistance.

Under the circumstances, it is considered to form preferably a composite hose by combining with a corrugated metal tube as a barrier layer against permeation of conveyed fluid.

For example, U.S. Pat. No. 6,354,332 discloses a composite hose with a corrugated metal tube of this type.

Meanwhile, when an internal pressure is exerted to such composite hose with a corrugated metal tube repeatedly, the corrugated metal tube suffers a large stress, and there is a fear that thereby the corrugated metal tube is fatigue-cracked at an early stage.

In order to prevent such fatigue-crack, the composite hose with a corrugated metal tube is preferably provided with a reinforcing layer in order to restrain the corrugated metal tube from deformation in longitudinal and radial directions by providing longitudinal and radial constrain with the corrugated metal tube.

Then, the inventors of the present invention manufactured a sample of composite hose with a corrugated metal tube which includes one reinforcing layer mainly for reinforcing in a longitudinal direction and the other reinforcing layer mainly for reinforcing in a radial direction, and evaluate the sample.

Figure 7:
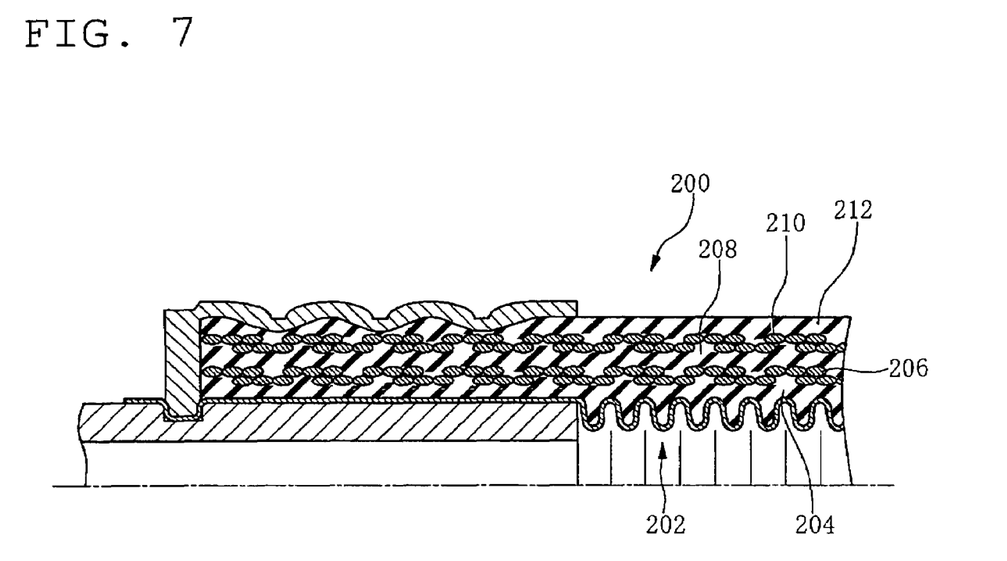
FIG. 7 is a view of a comparison example of a composite hose with a corrugated metal tube.

FIG. 7 shows one example thereof as comparison example.

With reference to FIG. 7, reference numeral 200 indicates a composite hose with a corrugated metal tube (hereinafter just referred to as a hose), which includes a corrugated metal tube 202 as an innermost layer by way of a barrier layer against permeation of conveyed fluid. A radial outer side of the corrugated metal tube 202 is laminated in sequence with a rubber filler layer 204, a first reinforcing layer 206, a middle rubber layer 208, a second reinforcing layer 210 and an outer surface rubber layer (cover rubber layer) 212.

Here, the first reinforcing layer 206 carries a function for pressure resistance when an internal pressure is exerted. The first reinforcing layer 206 is formed by braiding reinforcing thread made of organic fiber, at a braid angle or braiding angle larger than a neutral angle (about 55°).

The first reinforcing layer 206 serves mainly to restrain the hose 200 entirely from deforming in an expanding manner when an internal pressure is exerted.

The expansion restraint effect acts also on the corrugated metal tube 202. And, the first reinforcing layer 206 serves to restrain the corrugated metal tube 202 from deforming in an expanding manner when an internal pressure exerted.

On the other hand, the outer second reinforcing layer 210 mainly serves to restrain the hose 200 from dimensional change in a longitudinal direction, namely deformation in the longitudinal direction. Here, the second reinforcing layer 210 is formed by braiding a reinforcing wire member or filament member made of a metal wire, at a braid angle smaller than the neutral angle.

However, a durability test was conducted where an internal pressure is exerted repeatedly at intervals to the hose 200 which is bent into a U-shape (actually, a hose for automobile use, etc. is often equipped in such a bent form). And, it was found that the hose 200 does not necessarily have sufficient durability.

Then the hose 200 to which the test was conducted is examined with regard to its fatigue-cracked area. And it is recognized that the hose 200, specifically the corrugated metal tube 202 was dimensionally changed, namely deformed excessively in the longitudinal direction resulting in the fatigue-crack initiation at early stage.

From this test result, the inventors estimated that the second reinforcing layer 210 did not have a sufficient effect to restrain deformation in the longitudinal direction, and prepared another sample of the hose 200 including the second reinforcing layer 210 where a braid density or braiding density is increased. Although a durable life of the hose 200 was expected to be prolonged, it was decreased after all.

Then, the inventors pursued the cause why the durability of the hose 200 is lowered after all by forming the second reinforcing layer 210 by braiding the reinforcing wire member made of a metal wire at increased braid density, and recognized in pursuit of the cause the fact that thus formed second reinforcing layer 210 debonded and separated itself from an adjacent rubber layer on an inner peripheral side of the U-shaped bend thereof, so-called dropout phenomenon occurs.

When the second reinforcing layer 210 debonds and separates itself in such manner, as a matter of course, sufficient reinforcing effect is not provided by the second reinforcing layer 210.

Although in this way the second reinforcing layer 210 separates itself at a portion on the inner peripheral side of the U-shape bend thereof when the durable test is conducted by exerting an internal pressure to the hose 200 which is bent into a U-shape, the reason for that is regarded as follows.

Figure 8A:
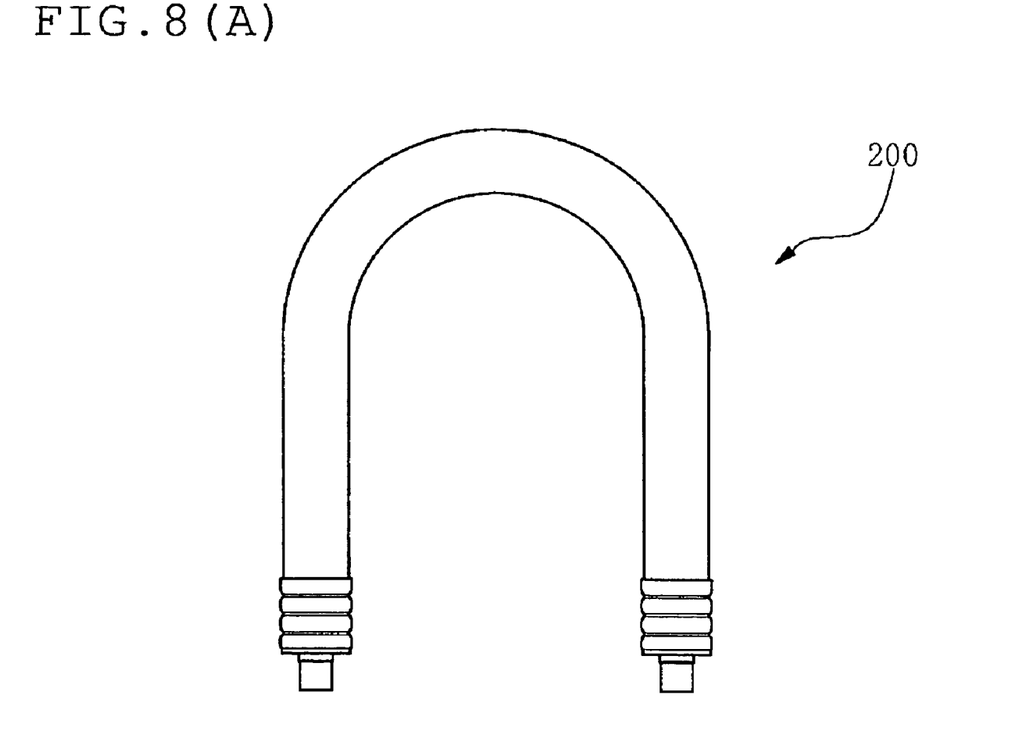
FIG. 8(A) is a view to explain a problem associated with a composite hose with a corrugated metal tube.
Figure 8B:
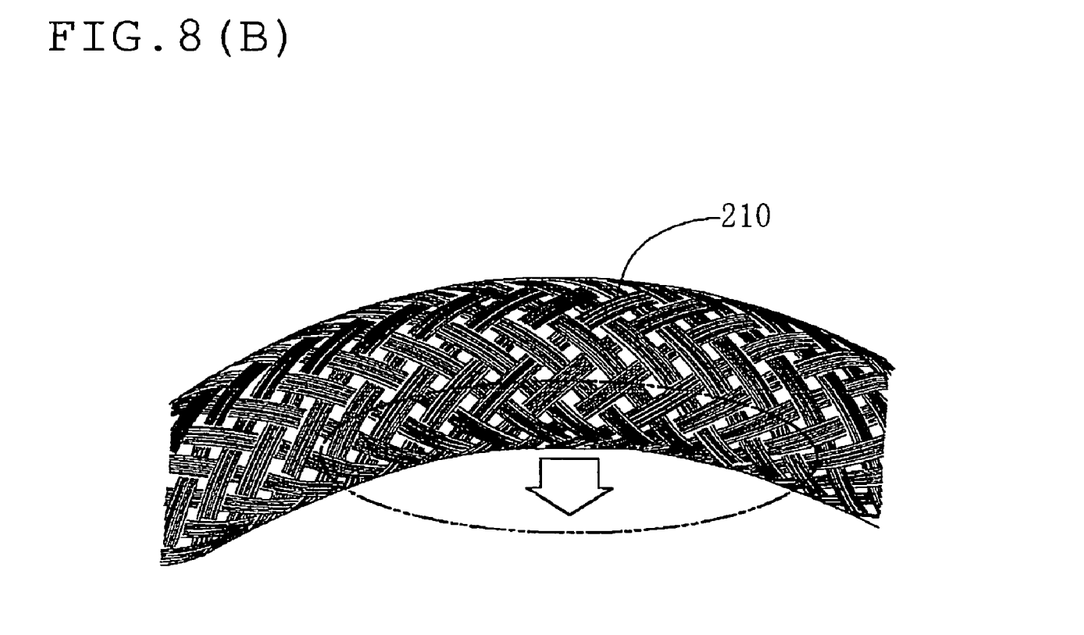
FIG. 8(B) is a view showing a direction of force exerted to a metal wire in FIG. 8(A).
Figure 9A:
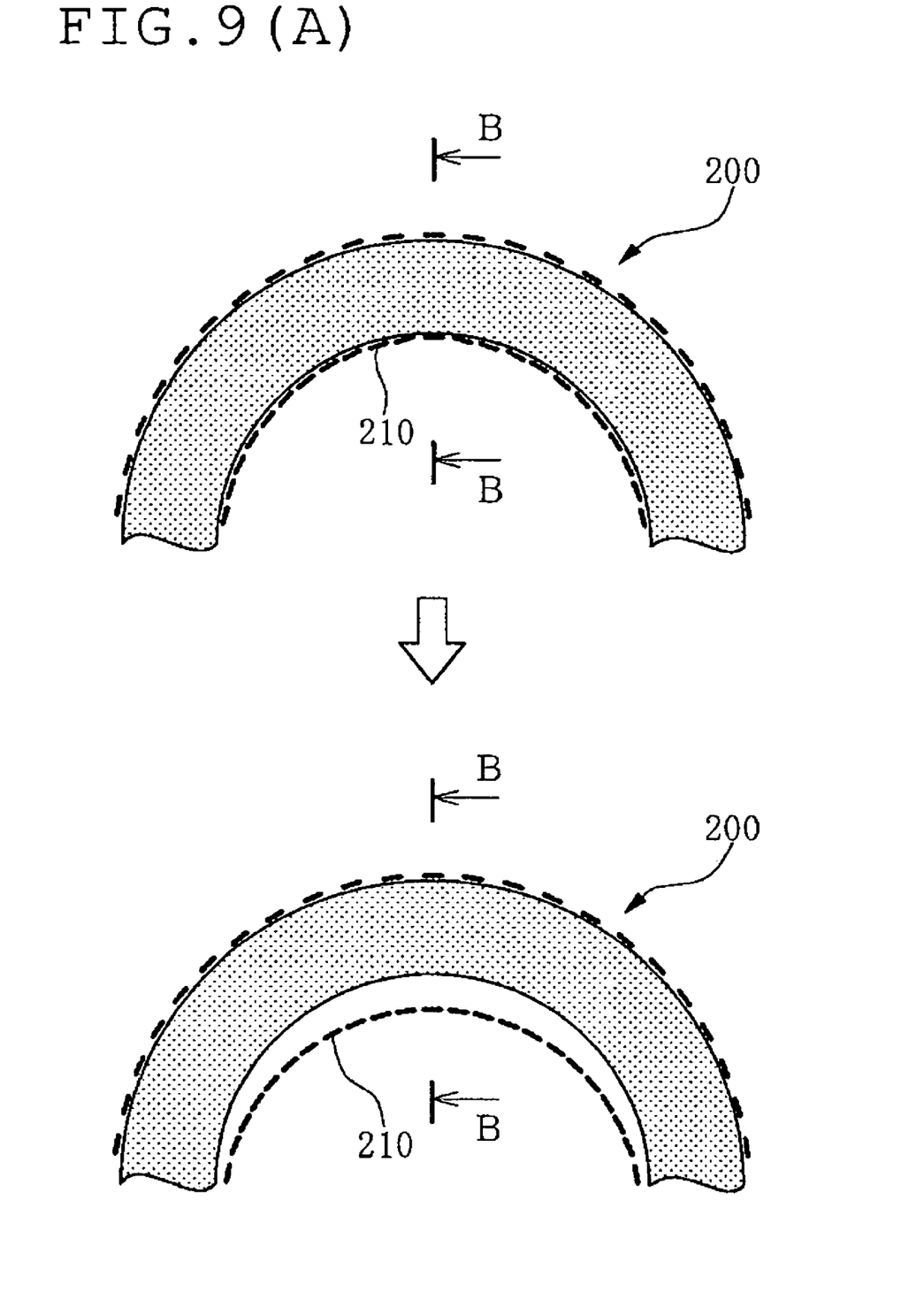
FIG. 9(A) is an enlarged view of a relevant portion of FIG. 8 (A).
Figure 9B:
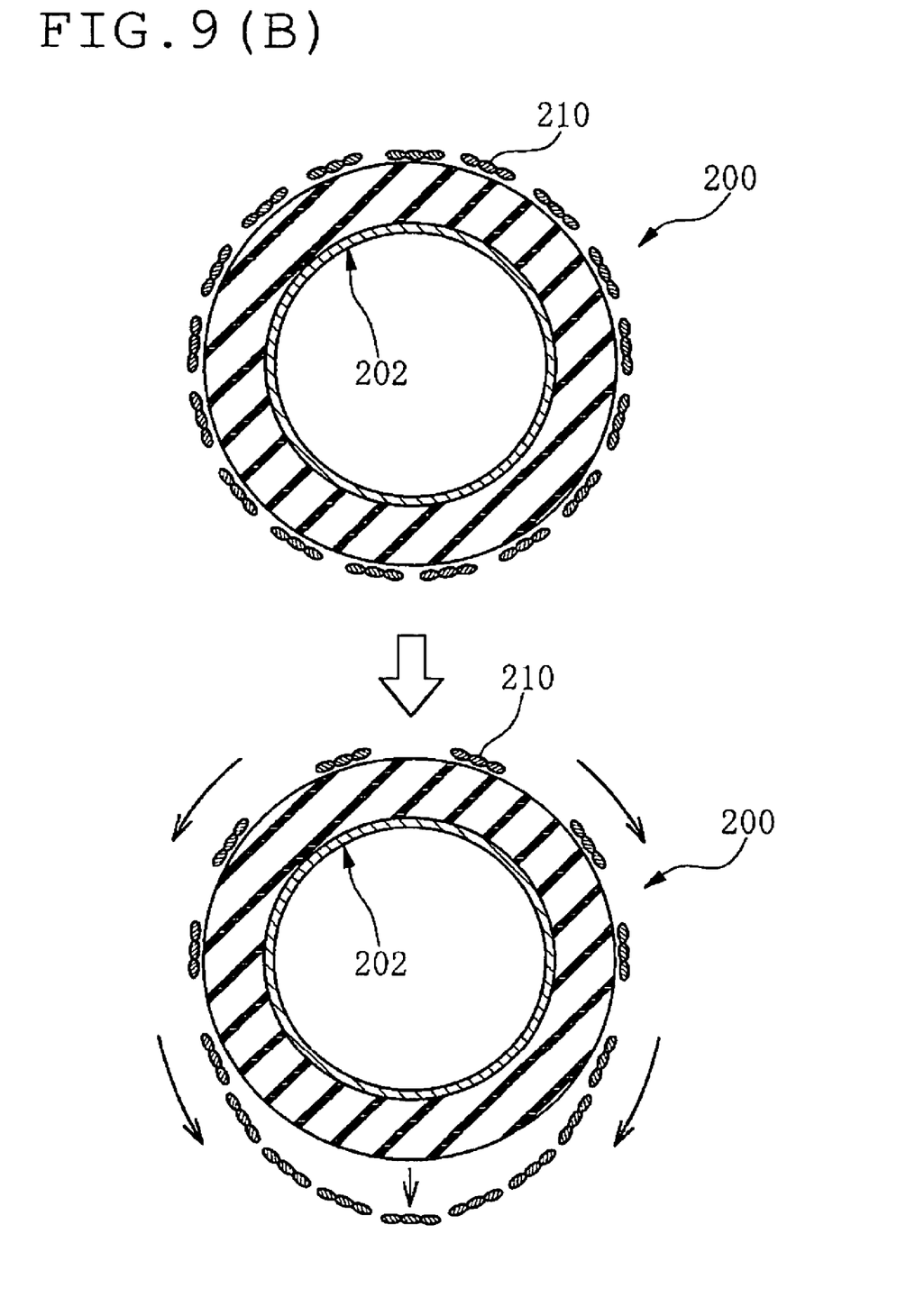
FIG. 9(B) is a sectional view taken along a line B—B of FIG. 9 (A).

The second reinforcing layer 210 is formed from a reinforcing wire member made of a metal wire. Therefore, the second reinforcing layer 210 has very large rigidity compared to that formed from a reinforcing thread made of an organic fiber. So, as shown in FIG. 8(A), when the hose 200 is sharply bent into U-shape, a force is exerted to the metal wire in an axial and compressing direction on an inner peripheral side of U-shape bend, i.e., on a contracting side in a longitudinal direction. On the other hand, at a portion on an outer peripheral side of the U-shape bend, namely on an expanding side in a longitudinal direction, a force is exerted thereto in a pulling direction. As a result, a force is exerted to the metal wire downwardly as shown by an arrow in FIG. 8(B). Then, the metal wire cannot bear the force, debonds and separates itself from an adjacent rubber layer downwardly in the figure. Consequently, drop-out phenomenon seems to occur as shown in FIGS. 9(A) and (B), more specifically there seems to occur the phenomenon that the metal wire, namely the second reinforcing layer hangs downwardly on the inner peripheral side of the U-shape bend thereof.

And, the higher braid density of the metal wire the second reinforcing layer 210 has, the more the phenomenon seems to be promoted.

The reason that the durability of the hose is lowered after all when the braid density of the metal wire is increased seems due to this fact.

The present invention is made under the foregoing circumstances. It is an object of the present invention to provide a composite hose with a corrugated metal tube wherein although a reinforcing layer is formed by braiding a reinforcing wire member made of a metal wire, the reinforcing layer does separate itself, offers favorably an effect of restraining the composite hose from being deformed in a longitudinal direction, and thereby a favorable durable life is provided.

SUMMARY OF THE INVENTION

According to the present invention there is provided a novel composite hose with a corrugated metal tube. The composite hose comprises a corrugated metal tube as a barrier layer against permeation of conveyed fluid, and a reinforcing layer which is formed by braiding a reinforcing wire member or filament member made of a metal wire. A braid density of the reinforcing layer is 55% or less. That is, the braid density thereof is designed low.

According to one aspect of the present invention, the braid angle of the reinforcing layer is smaller than a neutral angle.

The reinforcing layer may be adapted as a second reinforcing layer, and another reinforcing layer may be provided as a first reinforcing layer which is formed by braiding a reinforcing wire member or filament member.

Here, a braid angle of the first reinforcing layer may be larger than the neutral angle.

As stated, in the present invention, the composite hose comprises a corrugated metal tube as a barrier layer against permeation of conveyed fluid, and a reinforcing layer which is formed by braiding a reinforcing wire member made of a metal wire and has a low braid density of 55% or less.

The present invention is made based on the findings which are obtained as a result of the above study of the inventors. The present invention solves the problem that a reinforcing layer formed from a metal wire debonds and separates itself from or drops out of an adjacent layer, and thereby loses its original effect of restraining deformation in a longitudinal direction. The present invention allows such a reinforcing layer to carry out its original function sufficiently and enhances a durable life of a composite hose with a corrugated metal tube.

A braid density of the reinforcing layer (or the second reinforcing layer) is preferably 6% or more. Here, the braid angle of the reinforcing layer (or the second reinforcing layer) may be lower or smaller than a neutral angle.

In the present invention, the reinforcing layer may be adapted as a second reinforcing layer and another reinforcing layer may be provided as a first reinforcing layer by braiding a reinforcing wire member or filament member.

A braid angle of the first reinforcing layer may be larger or higher than a neutral angle.

In this construction, in addition to a reinforcing effect given by the second reinforcing layer, a further reinforcing effect is given by the first reinforcing layer. So, the first reinforcing layer restrains the hose, specifically the corrugated metal tube from dimensional change in a radial direction, namely deformation in the radial direction. Therefore, obtained is an effect that the corrugated metal tube is entirely restrained from deformation both in a longitudinal direction and in a radial direction.

Now, the preferred embodiments of the present invention will be described in detail with reference to the drawings.

DETAILED DESCRIPTIONS OF PREFERRED EMBODIMENTS

Figure 1:
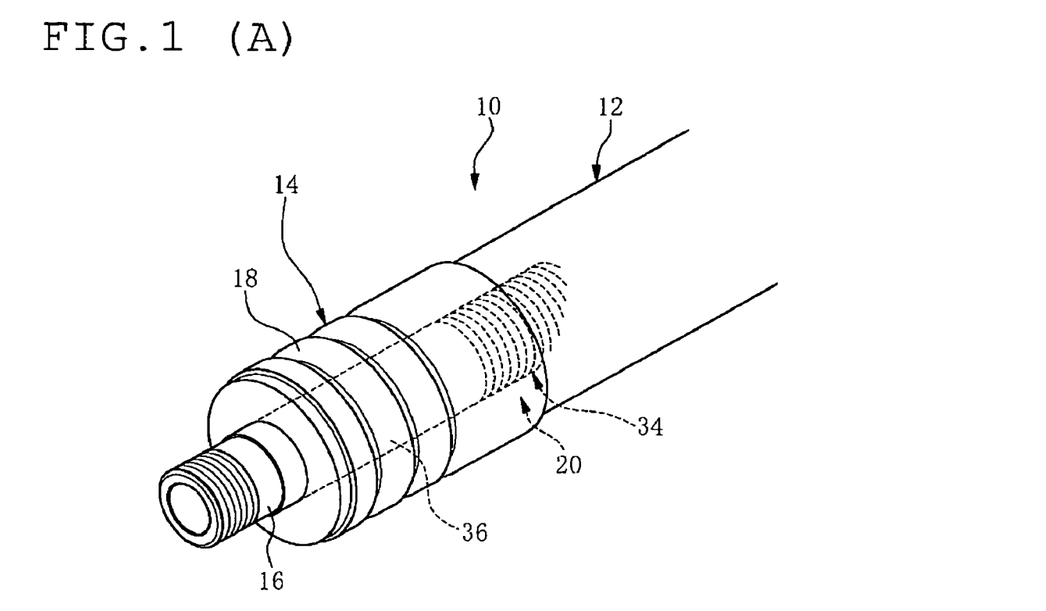
FIG. 1(A) is a perspective view of a composite hose with a corrugated metal tube of one embodiment according to the present invention.
FIG. 1(B) is a perspective view showing construction of the composite hose with a corrugated metal tube of FIG. 1(A).
Figure 2:
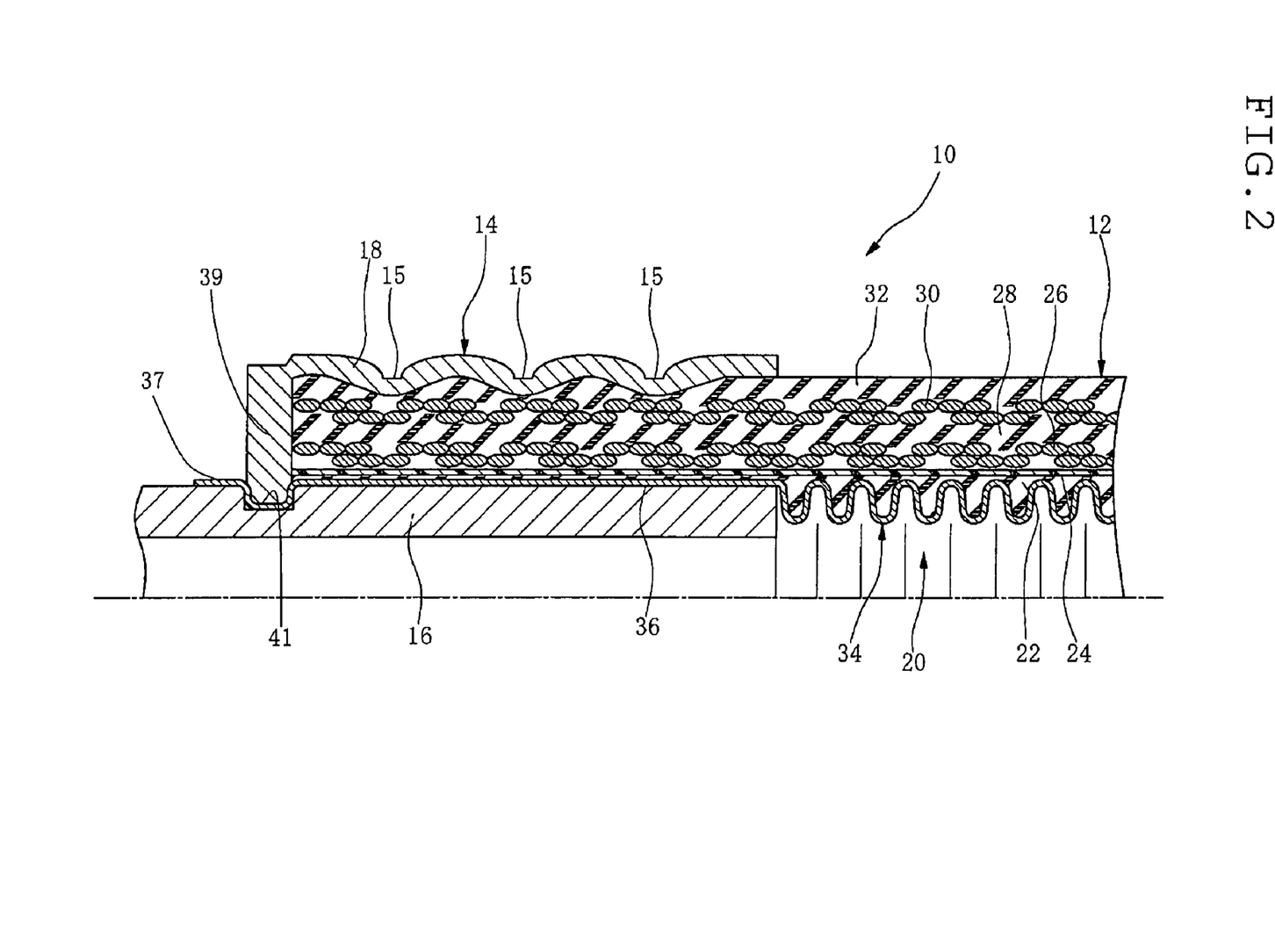
FIG. 2 is a cross-sectional view of the composite hose with a corrugated metal tube of FIG. 1(A).

In FIGS. 1(A), 1(B) and 2, numeral reference 10 indicates a composite hose with a corrugated metal tube (hereinafter referred to just as a hose), numeral reference 12 a hose body, and numeral reference 14 a metal joint fitting attached on an end portion of the hose body 12.

The joint fitting 14 has a metal insert fitting 16 like a pipe and a metal socket fitting 18 like a sleeve. The insert fitting 16 and the socket fitting 18 are fixedly secured on the end portion of the hose body 12 by securely compressing the socket fitting 18 onto the hose body 12 in a radially contracting direction.

The hose 10 has a corrugated metal tube 20 as an innermost layer. A radially outer side of the corrugated metal tube 20 is covered or laminated in sequence with a rubber filler layer 22 as an elastic filler layer, a hard resin layer 24, a first reinforcing layer 26, a middle rubber layer 28, a second reinforcing layer 30, and an outer surface layer (cover rubber layer) 32 as an outermost layer.

The corrugated metal tube 20 has a corrugated portion 34 and a straight-wall portion or straight-walled portion 36 of straight tubular shape on an end portion of the corrugated metal tube 20. The above insert fitting 16 is inserted inside the straight-walled portion 36, while the socket fitting 18 is securely compressed onto the end portion of the hose body 12 (refer to reference numeral 15), where the straight-walled portion 36 is disposed as an innermost layer. So, the straight-walled portion 36 of the corrugated metal tube 20 is pressed in a diametrically contracting direction and held against or securely compressed onto the insert fitting 16 by the socket fitting 18 via outer layers, more specifically, the rubber filler layer 22, the hard resin layer 24, the first reinforcing layer 26, the middle rubber layer 28, the second reinforcing layer 30 and the outer surface rubber layer 32. Consequently, permeation resistance is ensured at a connected portion between the insert fitting 16 and the straight-walled portion 36. The straight-walled portion 36 includes an extending portion 37 which extends beyond an inwardly directed collar-like portion 39 of the socket fitting 18, axially outwardly from the outer layers. Here, the extending portion 37 is clamped between an inner end portion of the inwardly directed collar-like portion 39 of the socket fitting 18 and an annular groove 41 of the insert fitting 16. The extending portion 37 is pressed by the inwardly directed collar-like portion 39 and deformed along the annular groove 41. A wall thickness of the inner end portion of the inwardly directed collar-like portion 39 before securely compressing or swaging the socket fitting 18 may be designed at least larger than a value given by subtracting double of a wall thickness of the extending portion 37 from a width of the annular groove 41. In such construction, the inner end portion of the inwardly directed collar-like portion 39 of the socket fitting 18 may be plastically deformed and fitted or bitten in the annular groove 41 securely at the time of securely compressing operation. So, permeation resistance is thereby further enhanced at the connected portion between the insert fitting 16 and the straight-walled portion 36.

The corrugated metal tube 20 of an innermost layer serves as a barrier layer against permeation of conveyed fluid, and is given flexibility by the corrugated portion 34.

Figure 3:
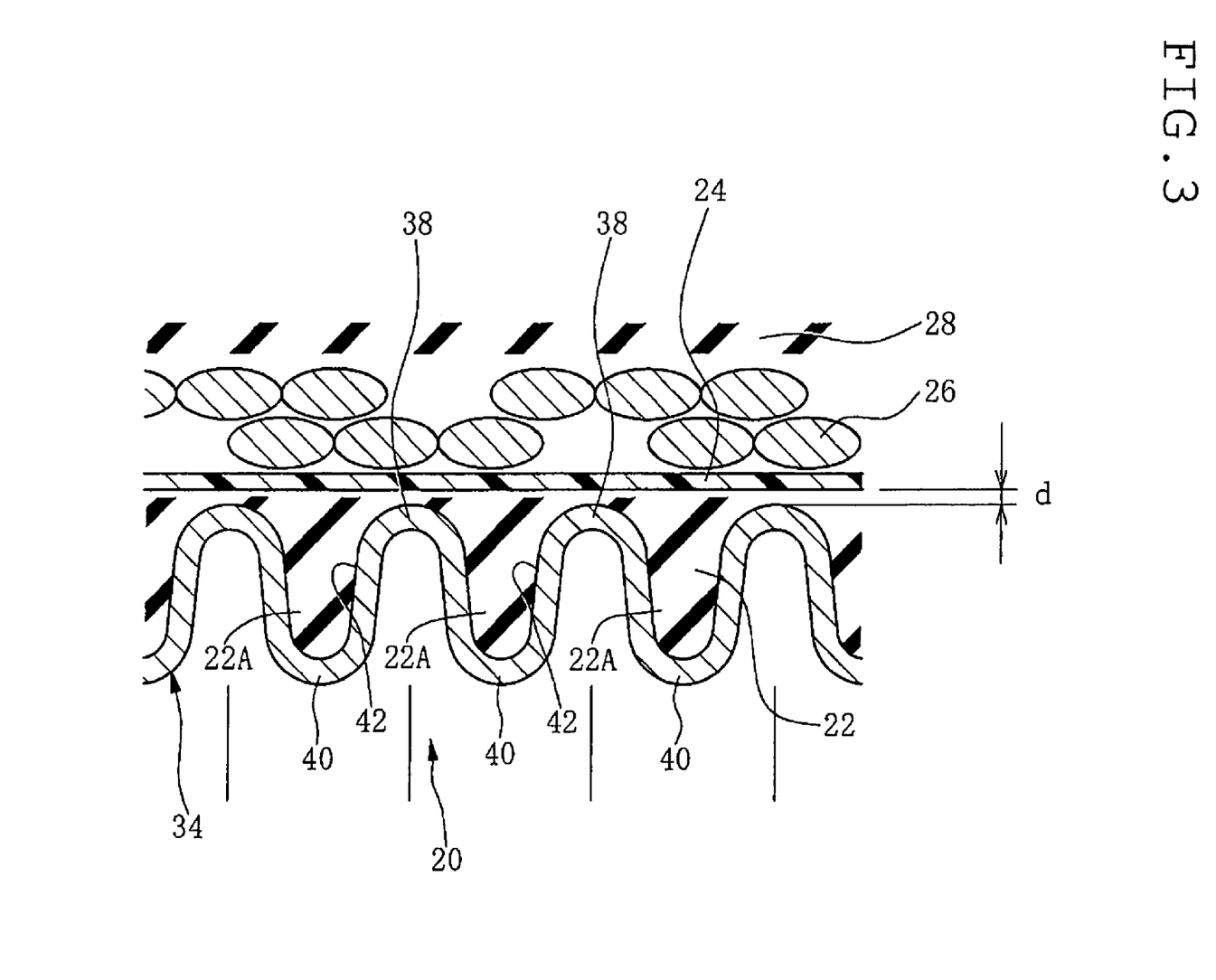
FIG. 3 is an enlarged view of a relevant portion of FIG. 2.

The rubber filler layer 22 is a layer which penetrates in valley gaps 42 between adjacent corrugation hills 38, 38 of the corrugated portion 34 on an outer peripheral side thereof as shown in FIG. 3 in order to restrain the corrugated portion 34 from deformation in an expanding manner when an internal pressure is exerted to the corrugated portion 34. The rubber filler layer 22 is preferably a layer made of a solid rubber which is a nonfoamed material so as to have a major effect in restraining deformation in an expanding manner.

And, the middle rubber layer 28 serves to restrain the first reinforcing layer 26 and the second reinforcing layer 30 from being displaced, for example, in a longitudinal direction, with respect to one another and being worn out, and to unify these layers. Further, the outer surface rubber layer 32 as an outermost layer serves to protect the reinforcing layer 30.

Meanwhile, the hard resin layer 24 serves to enclose or confine the rubber filler 22A which is filled in the valley gaps 42 or gaps 42 between the corrugation hills 38, 38 on an outer peripheral side of the corrugated portion 34 within the valley gaps 42. Thus, the rubber filler 22A is prevented from escaping out of the valley gaps 42 radially outwardly when the corrugated metal tube 20 is deformed.

In this embodiment, the first reinforcing layer 26 is laminated and formed directly on an outer surface of the resin layer 24.

Here, a rubber layer may be interposed between the resin layer 24 and the first reinforcing layer 26. However, in case where the first reinforcing layer 26 is braided or wound directly on an outer surface of the resin layer 24, direct contact is defined between the resin layer 24 and the first reinforcing layer 26. When the resin layer 24 and the first reinforcing layer 26 contact directly with one another, the first reinforcing layer 26 can effectively restrain radial change of the resin layer 24.

The first and second reinforcing layers 26, 30 are provided to secure pressure resistance. The first reinforcing layer 26 of these reinforcing layers is provided mainly to restrain a dimensional change of the hose 10 in a radial direction, namely a deformation thereof in the radial direction. Here the first reinforcing layer 26 is formed by braiding or spirally winding a reinforcing thread made of an organic fiber. A braid angle, a winding angle or the like $\theta_2$ (refer to FIG. 4) is larger than a neutral angle (about 55°).

When an internal pressure is exerted, the braid angle or winding angle of the reinforcing thread of the first reinforcing layer 26 changes toward the neutral angle, and therefore the first reinforcing layer 26 tends to contract in a radial direction and expand in a longitudinal direction.

That means, the first reinforcing layer 26 does not expand in the radial direction, and thereby serves to restrain the hose 10 from deforming in an expanding manner in the radial direction.

The first reinforcing layer 26 may be formed by braiding or winding a reinforcing wire member made of a metal wire.

On the other hand, the second reinforcing layer 30 is provided mainly to restrain a dimensional change of the hose 10 in a longitudinal direction, namely a deformation thereof in a longitudinal direction. Here the second reinforcing layer 30 is formed by braiding or spirally winding a reinforcing wire member or filament member made of a metal wire. A braid angle or a winding angle $\theta_1$ (refer to FIG. 4) is smaller than the neutral angle, preferably 30° to 40°.

As the braid angle or the winding angle is smaller than the neutral angle in the second reinforcing layer 30, when an internal pressure is exerted, the second reinforcing layer 30 tends to contract in the longitudinal direction and thereby it serves to restrain the hose 10 from elongating in the longitudinal direction under an internal pressure exerted.

So, owing to the above effects of the first and second reinforcing layers 26 and 30, the hose 10 is entirely restrained from being deformed in the radial direction and also in the longitudinally direction.

As explained above, since the braid angle or the winding angle of the second reinforcing layer 30 is smaller than the neutral angle, preferably 30° to 40°, it restrains the hose 10 from change in the longitudinal direction. However, the second reinforcing layer 30 tends to move in the radial direction, and therefore, the second reinforcing layer 30 drops out as stated above more often.

The present invention exerts a large effect when applied to the hose 10 including a reinforcing layer which has a braid angle smaller than the neutral angle (here, the second reinforcing layer 30) in order to restrain a longitudinal change of the hose 10 in such manner. The present invention may solve a failure due to dropout of the reinforcing layer.

In this embodiment, the first reinforcing layer 26 is designed to have a braid density or a winding density of about 80%. On the other hand, the second reinforcing layer 30 is designed to have a low braid density or a low winding density of 55% or less, but preferably 6% or more.

Specifically, the second reinforcing layer 30 preferably has the braid density or the winding density of about 50%.

Figure 4:
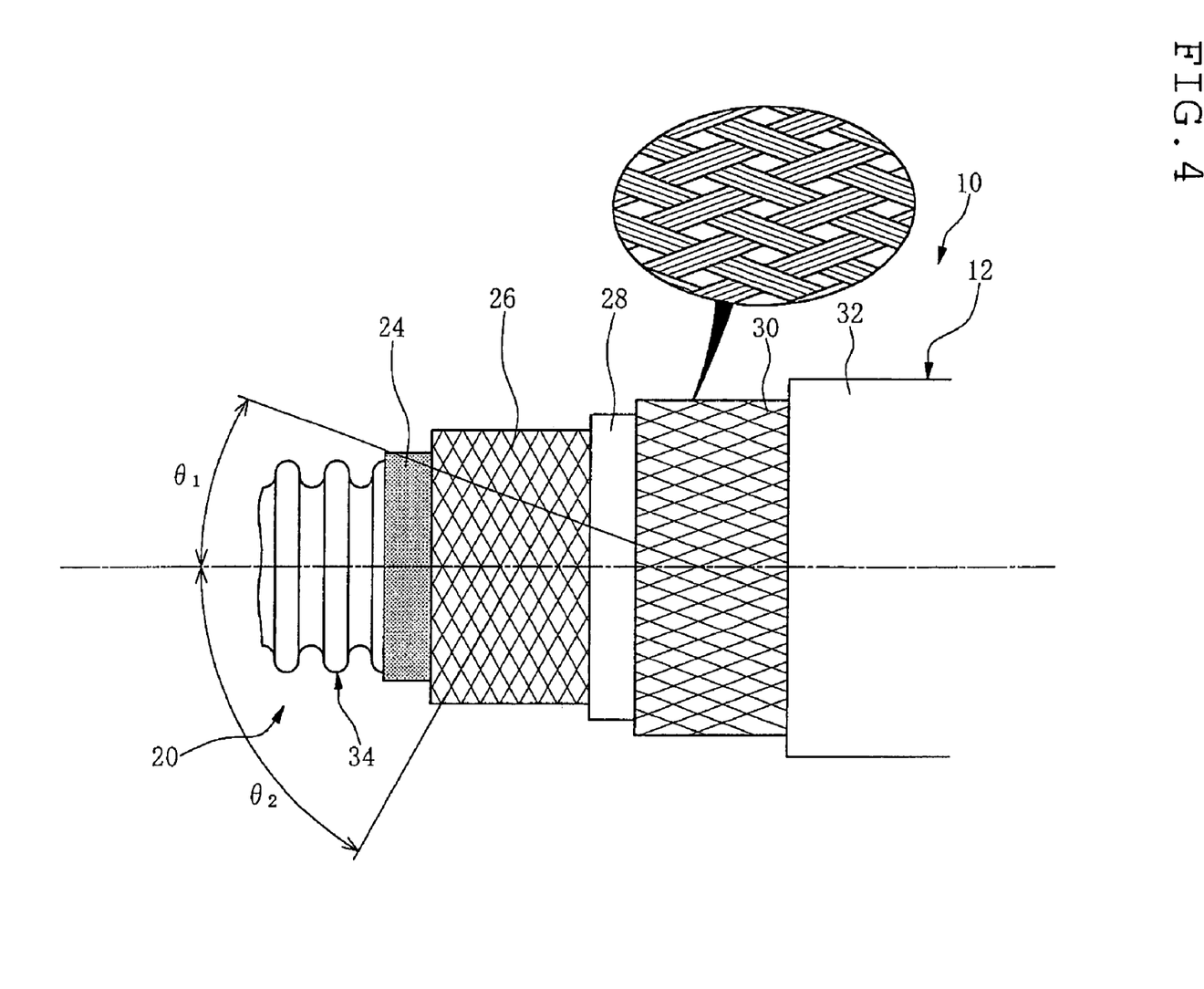
FIG. 4 is a view to explain braiding status of reinforcing layers of the composite hose with a corrugated metal tube of FIG. 1(A).

As shown in the enlarged view of the relevant portion in FIG. 4, the second reinforcing layer 30 is formed by braiding a wire code in which each reinforcing wire member made of a metal wire is parallel-laid to each other.

The braid density means percentage of a reinforcing wire member of a reinforcing layer covering a unit outer surface, for example, of the resin layer 24 or the middle rubber layer 28. The braid density percentage is calculated as $(dJK/2\pi E\cos\alpha)\times 100$. In the calculation, d represents a diameter of a wire code, J represents the number of parallel yarns, K represents the number of bobbins, E represents a diameter of the braided reinforcing layer and $\alpha$ represents a braid angle. The number of parallel yarns J means the number of parallel yarns per wire code, and the number of bobbins K means the number of bobbins used for braiding or the number of wire codes (for example, the number of wire codes per unit length of the hose 10).

The corrugated metal tube 20 preferably has a wall thickness of 0.5 mm or less in view of required elasticy and flexibility.

On the other hand, the corrugated metal tube 20 preferably has a wall thickness of 0.1 mm or more in view of workability of a metal tube.

The corrugated metal tube 20 has a single layer construction. However, the corrugated metal tube 20 may have a multi-layer construction.

And, as for material of the corrugated metal tube 20, stainless steel, iron and steel, aluminum or aluminum alloy, copper or copper alloy, nickel or nickel alloy, titanium or titanium alloy, or the like may be used. The material of the corrugated metal tube 20 may be selected properly from these metals in view of resistance to conveyed fluid, durability against vibration/pressure, workability of a metal tube, or the like. Specifically, stainless steel is preferably used.

In this embodiment, as for material for reinforcing wire member of the first reinforcing layer 26, usable are reinforcing threads formed from organic fiber, and as for material or raw material for the reinforcing wire members, usable are various other materials. According to need metal wire members may be used.

The above middle rubber layer 28 may have a wall thickness of an range between 0.1 mm and 5.0 mm. However, the wall thickness of the middle rubber layer 28 is preferably between 0.1 mm and 0.5 mm in view of wear prevention and unification for the first reinforcing layer 26 and the second reinforcing layer 30.

And, the middle rubber layer 28 itself may have a multi-layer construction.

Materials for the middle rubber layer 28 and the rubber filler layer 22 are selected properly in view of adhesiveness to an adjacent layer, flexibility or elasticity, resistance to service conditions (external liquid or mechanical shock) etc., workability, or the like.

For example, the material for the middle rubber layer 28 and the rubber filler layer 22 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

As the case may be, other elastic materials than rubber such as thermoplastic elastomer may be used to form the rubber filler layer 22 and the middle rubber layer 28.

The outer surface rubber layer 32 may be omitted depending on service conditions. However, the outer surface rubber layer 32 is preferably provided in view of protecting the corrugated metal tube 20, reinforcing layers such as the first reinforcing layer 26 and the second reinforcing layer 30 from external liquid, mechanical shock or the like. The outer surface rubber layer 32 preferably has a wall thickness of about 0.2 mm to 2.0 mm.

A material for the outer surface rubber layer 32 is selected properly in view of adhesiveness to an adjacent layer, flexibility or elasticity, resistance to service conditions (external liquid or mechanical shock) etc., workability, or the like.

For example, the material for the outer surface rubber layer 32 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type or the like. And, Hypalon (trademark of Dupont) rubber type may be also selected.

And, as the case may be, other materials than rubber such as thermoplastic elastomer may be used to form the outer surface rubber layer 32.

The hard resin layer 24 preferably has a wall thickness of 0.15 mm or more.

On the other hand, if too large wall thickness thereof increases rigidity of the hose entirely and thereby impairs flexibility or elasticity of the hose entirely. Therefore, preferably a maximum of the wall thickness of the resin layer 24 is 0.30 mm.

As for material for the hard resin layer 24, usable is resin such as an alloy material of polyamide-6 (PA6) and ethylene-propylene diene rubber (EPDM), polyethylene (PE), polypropylene (PP), PA6, polyamide-11 (PA11), polyamide-12 (PA12), polyethylene terephthalate (PET), polybutylene terephthalate (PBT), polybuthylene naphthalate (PBN), polyvinylidene fluoride (PVDF), ethylene-tetrafluoroethylene copolymer (ETFE), polytetrafluoroethylene (PTFE), polyphnylene sulfide (PPS), acrylonitrile-butadiene-styrene copolymer (ABS), polyethylene-vinyl acetate (EVA) or the like.

EXAMPLE

Figure 5:
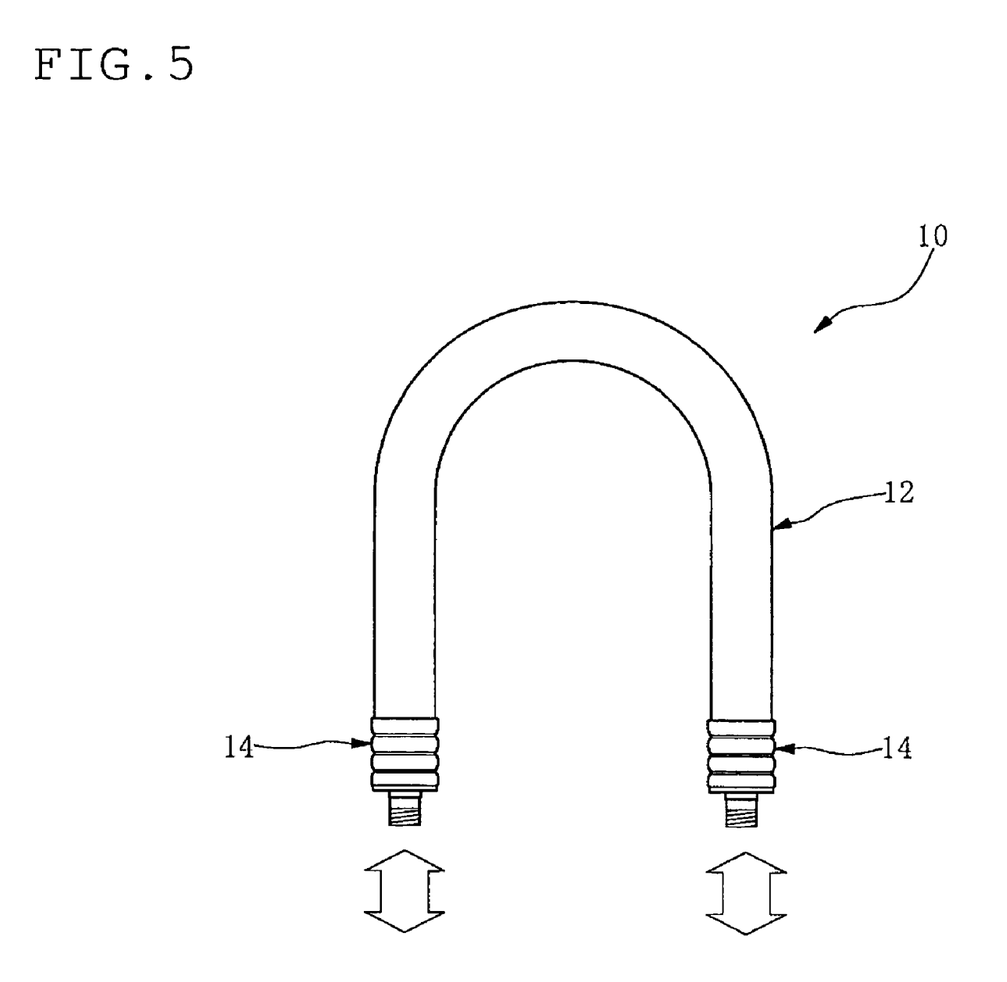
FIG. 5 is a view showing a bending shape of a composite hose with a corrugated metal tube in a durability test.

Samples of a composite hose with a corrugated metal tube as shown in Table 1 are produced. The second reinforcing layers are constructed specifically as shown in Table 2. Then an impulse test was conducted as a durability test on the samples which were bent in U-shape in a manner shown in FIG. 5 by exerting an internal pressure thereto repeatedly under the following conditions.

| <Conditions of the durability test> | |
|---|---|
| Bend R (radius): | 70 mm |
| Temperature: | 130° C. |
| Pressure: | 0 <=> 22.5 Mpa |
| Frequency (pressure cycle repetitions/minute): | 30 cpm |

-continued

<Conditions of the durability test>

| | |
|---|---|
| Durability: | Number of cycle repetitions up to breakage of a hose |

TABLE 1

Construction of the sample hoses

| | Material | Wall thickness, etc. |
|---|---|---|
| Corrugated metal tube | SUS304 | t = 0.23 mm |
| Rubber filler layer | EPDM | t = 0.3 mm (on condition that the rubber filler layer is filled sufficiently in valley gaps) |
| Resin layer | ST811(alloy of PA6/EPDM) | t = 0.2 mm |
| First reinforcing layer | Aramid | Braid angle 64° |
| Middle rubber layer | EPDM | t = 0.5 mm |
| Second reinforcing layer | Diameter 0.2 wire | Braid angle 32° |
| Outer surface rubber layer | EPDM | t = 1.0 mm |

TABLE 2

| | | Density | |
|---|---|---|---|
| | | 52% | 66% |
| d: diameter of a wire code (mm) | | 0.2 | 0.2 |
| J: No. of parallel yarns | <-- The number of parallel yarns per wire code | 7 | 9 |
| K: No. of bobbins | The number of bobbins used for braiding | 24 | 24 |
| E: Diameter of a reinforcing layer formed by braiding | | 12.2 | 12.2 |
| α: Braid angle | | 32 | 32 |

*Density (%) = (dJK/2πECos α) × 100

Figure 6:
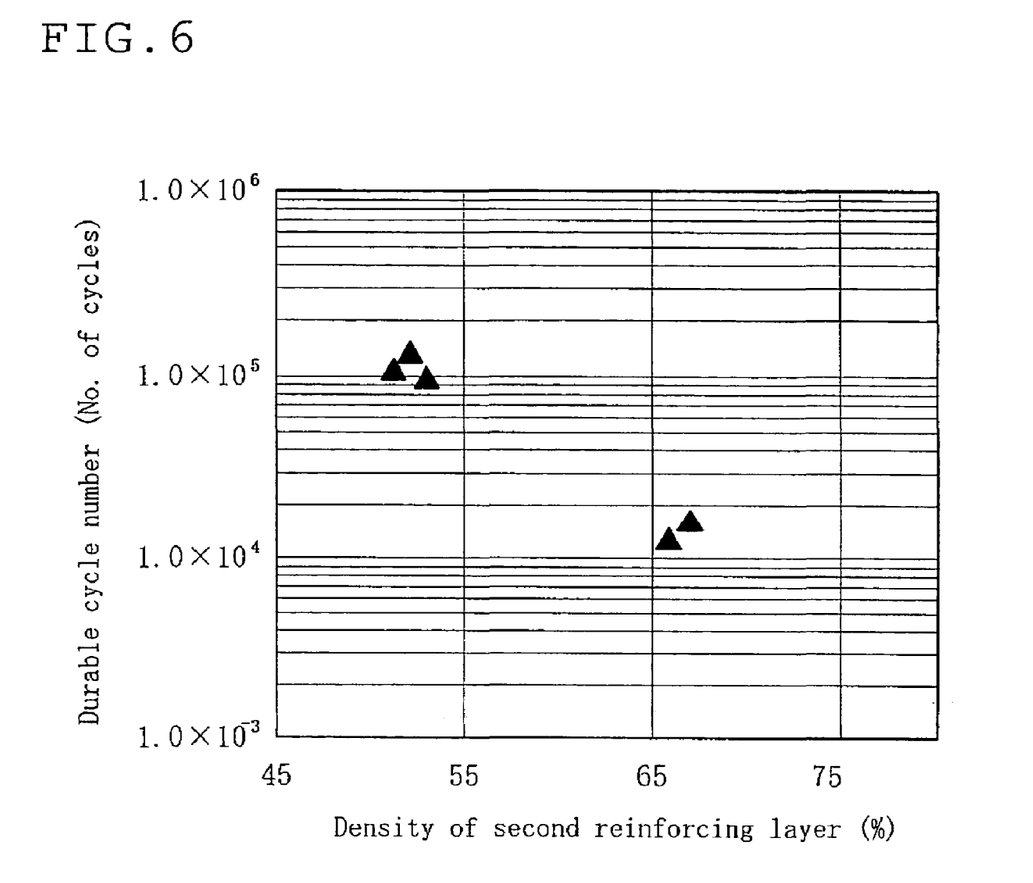
FIG. 6 is a view showing a relationship between a braid density of a second reinforcing layer and a durability of the composite hose with a corrugated metal tube.

The test results are shown in Table 3 and FIG. 6.

As apparent from the test results, a durable life of the hose 10 depends on a density of the second reinforcing layer 30. The durability of the hose 10 is increased by decreasing a density thereof.

The sample hose with the second reinforcing layer of a density of 66% is examined after the durability test, and it is recognized that the second reinforcing layer 30 debonds and separates itself from an adjacent layer.

On the other hand, such failure is not recognized in the sample hose with the second reinforcing layer of a density of 52%, and the second reinforcing layer 30 remains bonded favorably to the adjacent layer.

It is recognized that these differences affect a result of the durability test.

TABLE 3

Braid density and durability

| Density of second reinforcing layer | Cycle number of durability (No. of cycles) | Remarks |
|---|---|---|
| 66% | 13514 | |
| 66% | 16766 | |
| 52% | 100063 | |
| 52% | 111646 | |
| 52% | 135000 | Stopped at this number of cycles |

While the present invention has been described in terms of preferred embodiments, it is to be understood that these are presented only for the purpose of illustration. The present invention can be embodied by a variety of modifications without departing from the scope of the invention.

What is claimed is:

1. A composite hose, comprising:
a corrugated metal tube as barrier layer against permeation of conveyed fluid, and
a first reinforcing layer formed by braiding a reinforcing wire member,
a second reinforcing layer disposed on an outer side of the first reinforcing layer and formed by braiding a reinforcing wire member made of a metal wire, and
a braid angle of the first reinforcing layer being larger than a neutral angle, the braid angle of the second reinforcing layer being smaller than the neutral angle and a braid density of the second reinforcing layer being low, 55% or less.

2. The composite hose as set froth in claim 1, wherein the braid angle of the second reinforcing layer is set in the range of 30° to 40°.

* * * * *